United States Patent
Hasegawa

(10) Patent No.: US 11,934,899 B2
(45) Date of Patent: Mar. 19, 2024

(54) INFORMATION PROCESSING DEVICE, PREDICTION METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Jin Hasegawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/445,108

(22) Filed: Aug. 16, 2021

(65) Prior Publication Data

US 2022/0058454 A1 Feb. 24, 2022

(30) Foreign Application Priority Data

Aug. 18, 2020 (JP) ................................. 2020-137849

(51) Int. Cl.
*G06K 15/02* (2006.01)

(52) U.S. Cl.
CPC ..... *G06K 15/1823* (2013.01); *G06K 15/1807* (2013.01); *G06K 15/1836* (2013.01); *G06K 15/1861* (2013.01)

(58) Field of Classification Search
CPC .......... G06K 15/1823; G06K 15/1807; G06K 15/1836; G06K 15/1861
See application file for complete search history.

(56) References Cited

U.S. PATENT DOCUMENTS

| | | | | |
|---|---|---|---|---|
| 5,287,194 | A | * | 2/1994 | Lobiondo ............. G06F 3/1282 358/1.15 |
| 5,768,489 | A | * | 6/1998 | Adachi .................. G06K 15/00 358/1.18 |
| 8,705,132 | B2 | | 4/2014 | Sonogi |
| 10,621,458 | B2 | | 4/2020 | Nakayama |
| 10,951,306 | B1 | * | 3/2021 | Thommana ............ G06N 20/00 |
| 2008/0079976 | A1 | * | 4/2008 | van de Capelle ..... G06F 3/1205 358/1.13 |
| 2012/0287476 | A1 | | 11/2012 | Sonogi |
| 2013/0024404 | A1 | * | 1/2013 | Zacharia ................ G06N 20/00 706/12 |
| 2017/0161105 | A1 | * | 6/2017 | Barrett .................... G06N 20/00 |
| 2018/0268241 | A1 | * | 9/2018 | Nakayama ............. G06V 10/95 |
| 2019/0268580 | A1 | * | 8/2019 | Niitsuma ................. H04N 9/43 |
| 2021/0072929 | A1 | * | 3/2021 | Tajima .................. G06F 3/1237 |

FOREIGN PATENT DOCUMENTS

| | | |
|---|---|---|
| JP | 2004185048 A | 7/2004 |
| JP | 2012236344 A | 12/2012 |
| JP | 2018157250 A | 10/2018 |
| JP | 2020-046719 A | 3/2020 |

* cited by examiner

*Primary Examiner* — Akwasi M Sarpong
*Assistant Examiner* — Michael L Burleson
(74) *Attorney, Agent, or Firm* — WORKMAN NYDEGGER

(57) ABSTRACT

An information processing device includes an information acquisition unit that acquires at least one of attribute information of image data to be image processed and setting information related to the image process on the image data, and a prediction unit that predicts, based on a machine-learned model that accepts input of at least one of the attribute information and the setting information to output a period required for the image process, a period required for the image process on the image data from information acquired by the information acquisition unit.

10 Claims, 10 Drawing Sheets

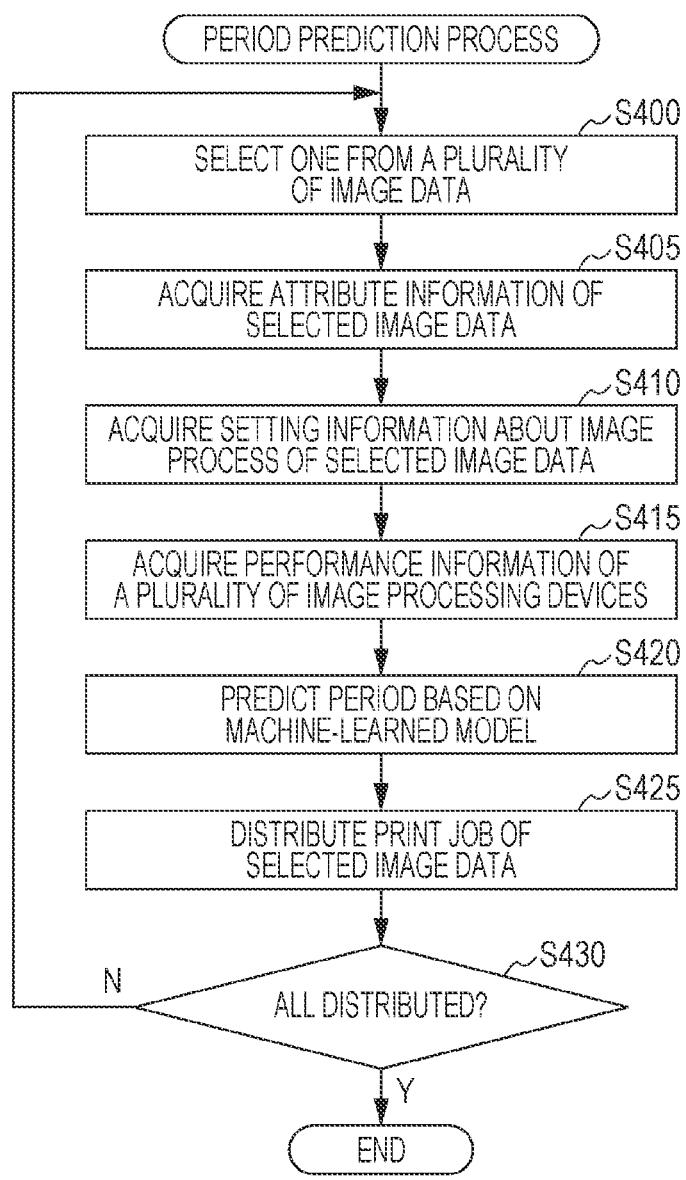

INFORMATION PROCESSING DEVICE, PREDICTION METHOD, AND NON-TRANSITORY COMPUTER-READABLE STORAGE MEDIUM STORING PROGRAM

The present application is based on, and claims priority from JP Application Serial Number 2020-137849, filed Aug. 18, 2020, the disclosure of which is hereby incorporated by reference herein in its entirety.

BACKGROUND

1. Technical Field

The present disclosure relates to an information processing device, a prediction method, and a non-transitory computer-readable storage medium storing a program.

2. Related Art

There has been offered a technique for predicting the period required for an image process such as a process of generating print data from image data (for example, a raster image processor (RIP) process). JP-A-2020-46719 discloses a system that estimates the total processing time from the processing time of the RIP process performed on part of print data.

When the image process is performed on the entire image data, an image process performed on part of the image data and an image process performed on the other part of the image data are not necessarily processed under the same conditions. As a result, there is a problem that in the technique for estimating the period required for an image process on the entire image data from the period actually required for an image process on part of the image data as in JP-A-2020-46719, the period required for the image process cannot be necessarily predicted accurately.

SUMMARY

According to an aspect of the present disclosure, an information processing device includes an information acquisition unit that acquires at least one of attribute information of image data to be image processed and setting information related to the image process on the image data, and a prediction unit that predicts, based on a model that accepts input of at least one of the attribute information and the setting information to output a period required for the image process, a period required for the image process on the image data from information acquired by the information acquisition unit.

According to an aspect of the present disclosure, a prediction method includes acquiring at least one of attribute information of image data to be image processed and setting information related to the image process on the image data, and predicting, based on a model that accepts input of at least one of the attribute information and the setting information to output a period required for the image process, a period required for the image process on the image data from the information acquired.

According to an aspect of the present disclosure, in a non-transitory computer-readable storage medium storing a program, the program causes a computer to function as an information acquisition unit that acquires at least one of attribute information of image data to be image processed and setting information related to the image process on the image data, and a prediction unit that predicts, based on a model that accepts input of at least one of the attribute information and the setting information to output a period required for the image process, a period required for the image process on the image data from information acquired by the information acquisition unit.

According to an aspect of the present disclosure, a learning device includes a teacher data acquisition unit that acquires teacher data in which at least one of attribute information of image data and setting information related to an image process, and a period required for the image process are associated with each other, and a learning unit that machine-learns, based on the teacher data acquired by the teacher data acquisition unit, a model that accepts input of at least one of the attribute information and the setting information to output a period required for the image process.

BRIEF DESCRIPTION OF THE DRAWINGS

FIG. 10 is a flowchart showing an example of a period prediction process.

DESCRIPTION OF EXEMPLARY EMBODIMENTS

Here, embodiments of the present disclosure will be described in the following order.
(1) Image processing system configuration
(2) Machine-learning process
(3) Period prediction process
(4) Other embodiments

(1) Image Processing System Configuration

Figure 1:
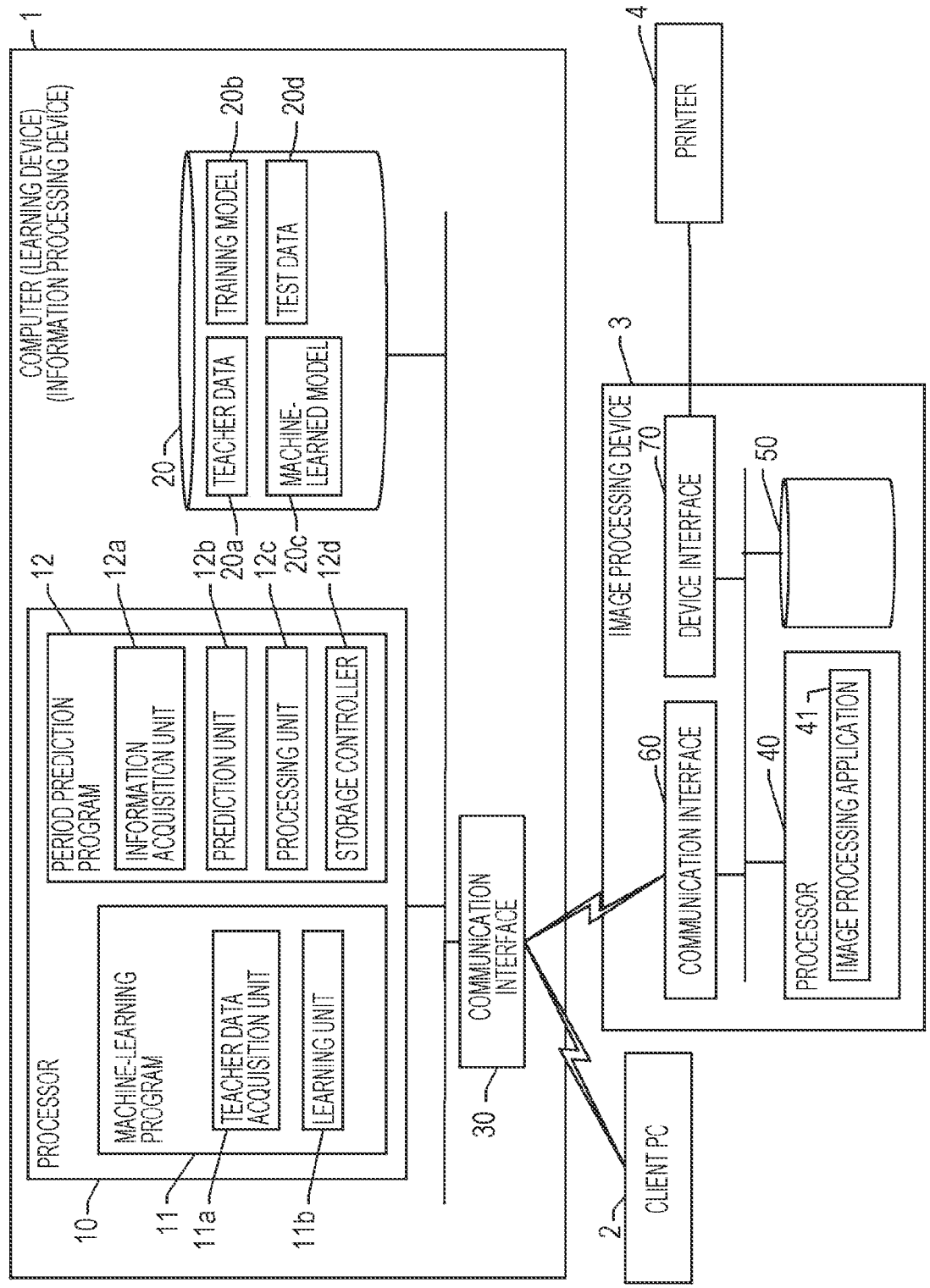
FIG. 1 is a block diagram showing an example of a configuration of an image processing system.

FIG. 1 is a block diagram showing an example of the configuration of an image processing system according to the present embodiment. The image processing system of the present embodiment includes a computer 1 that provides functions of an information processing device and a learning device, a client PC (personal computer) 2, an image processing device 3, and a printer 4. The image processing system of the present embodiment is a system that executes a print job from a client PC 2, and predicts the period required for the image process performed on the image data for printing. In the present embodiment, the image process performed on the image data for printing is the RIP process for converting the image data into a raster image used for printing. Further, in the present embodiment, the image data for printing is portable document format (PDF) data.

The computer 1 includes a processor 10, a hard disk drive (HDD) 20, and a communication interface 30. The communication interface 30 is an interface used for communication with devices such as the client PC 2 and the image processing device 3 connected to the computer 1 by wire or wirelessly.

The HDD 20 stores various programs, teacher data 20a used for machine-learning a model, a training model 20b to be learned, a machine-learned model 20c in which the training model 20b is machine-learned, test data 20d used for testing the machine-learned model 20c, and the like. Here, the training refers to "to be learned". The model is information such as an expression showing the correspondence between the data to be predicted and the data of the prediction result. In the present embodiment, a model, as an example, in which attribute information of the image data to be image processed, setting information related to the image process on this image data, and performance information of the image processing device that executes the image process are associated with the period required for the image process will be described. In the following, the information received by the model as input is referred to as model input information. The processor 10 includes a central processing unit (CPU), a random access memory (RAM), and the like, and can execute various programs recorded in the HDD 20. In the present embodiment, these programs include a machine-learning program 11 and a period prediction program 12.

The machine-learning program 11 is a program that causes the processor 10 to execute a function of learning a model used for predicting a period required for the image process on image data. The processor 10 functions as a teacher data acquisition unit 11a that acquires teacher data used for machine-learning a model and a learning unit 11b that performs machine-learning of the model by executing the machine-learning program 11.

The period prediction program 12 is a program that causes the processor 10 to execute a function of predicting the period required for the image process on image data based on a model machine-learned based on the function of a learning unit 11c. The processor 10 functions as an information acquisition unit 12a that acquires model input information and a prediction unit 12b that predicts the period required for the image process by executing the period prediction program 12. In addition, the processor 10 further functions as a storage controller 12d that updates the teacher data to re-learn the model, and a processing unit 12c that performs a process according to the prediction result by the prediction unit 12b.

The client PC 2 is used by a user who instructs a print job to transmit a print job of the image data to the computer 1 based on the user's operation via the input device of the client PC 2.

The image processing device 3 executes the RIP process on the image data included in the print job according to an instruction from the computer 1 of executing the print job to generate a raster image to transmit the generated raster image to the printer 4. The image processing device 3 includes a processor 40, an HDD 50, a communication interface 60, and a device interface 70. The communication interface 60 is an interface used for communication with a device such as a computer 1 connected to the image processing device 3 by wire or wirelessly.

The device interface 70 is an interface to which devices that communicate according to a predetermined communication protocol (for example, Universal Serial Bus (USB) standard) can be connected. In the present embodiment, the printer 4 is connected to the device interface 70. The HDD 50 stores various programs and the like. The processor 40 includes a CPU, a RAM, and the like, and can execute various programs recorded in the HDD 50. The processor 40 functions as an image processing application 41 by executing the programs recorded in the HDD 50.

Figure 2:
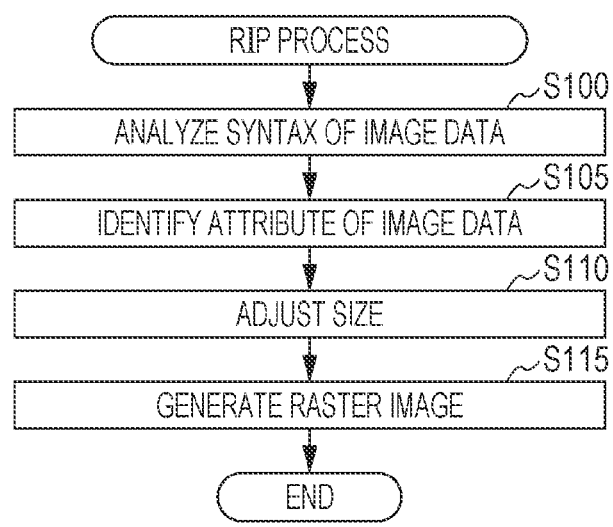
FIG. 2 is a flowchart showing an example of a RIP process.

Here, the RIP process, which is an image process executed by the image processing device 3, will be described with reference to FIG. 2. When the image processing device 3 accepts an instruction of executing the print job, the image processing device 3 starts the RIP process shown in FIG. 2. In S100, the processor 40 analyzes the syntax of the image data for printing included in the print job received from the computer 1 based on the function of the image processing application 41. In the present embodiment, the image processing application 41 performs an image process according to a predetermined setting. The setting related to the image process is a parameter for changing the content of the image process (RIP process) performed based on the image data, and there is a plurality of setting items. The plurality of setting items includes, for example, a type of the image processing engine used for the image process, a setting of the scaling factor of the image data, presence or absence of color replacement, a color setting, and the like. Here, the image processing engine is a mechanism of hardware or software that performs the image process. Examples of the image processing engine include a configurable postscript interpreter (CPSI), an Adobe (registered trademark) PDF print engine (APPE), and the like. The presence or absence of color replacement is a setting for whether to perform color replacement for an object or the like whose spot color is set. The color setting is a setting (for example, how much gradation the color is represented) for a finished color of the image process (raster image).

The period required for the image process predicted by the prediction unit 12b correlates with the setting related to the image process. This is because the setting related to the image process have an influence throughout the image process. However, for example, the content of an available image processing engine may be a black box. In such a case, it is difficult to accurately grasp what kind of fluctuation occurs in the content of the image process due to the difference in the image processing engine. In addition, when the content of the image processing engine is a black box, it is difficult to accurately grasp what kind of change has occurred in the content of the image process due to the change in the corresponding condition even when the value of the setting item in the image process is changed. Therefore, although the period required for the image process has a correlation with the setting related to the image process, it is difficult to accurately grasp what kind of correlation it has.

In S105, the processor 40 identifies the attribute of the image data for printing based on the analysis result in S100 based on the function of the image processing application 41. The attributes of the image data include the data size of the image data, the number of the objects included in the image data, and the types of the objects included in the image data. In addition, the attributes of the image data include the number of the objects whose spot color is set, presence or absence of the objects whose spot color is set, the number of the objects whose transparency effect is set, and presence or absence of the objects whose transparency effect is set. In addition, the attributes of the image data include the number of the objects whose overprint is set, presence or absence of the objects whose overprint is set, and the like.

Here, the objects are respective elements disposed in the image. The objects include a character object representing a character, a number object representing a number, a stream object representing arbitrary stream data (for example, a figure, an image, and the like), and a NULL object representing a NULL value. Also, the objects include a Boolean object representing a Boolean value, an array object representing an array of a plurality of the objects, a name object representing an ASCII character string in which ASCII characters other than NULL are disposed consecutively, and the like. Further, the spot color refers to an effect indicating that the color of the object in the raster image is converted into a predetermined color in the color space of the raster image in the RIP process. That is, color conversion from a gradation value indicating the color of the image data to a gradation value indicating the color of the raster image (for example, color conversion from the RGB color space to the CMYK color space) is not performed on the object whose spot color is set.

Further, the transparency effect refers to an effect indicating that when objects overlap at the same pixel in the raster image, the color of the overlapping portion in the raster image is made to a color obtained by combining the colors of the overlapped objects. The overprint refers to an effect indicating that when the objects overlap at the same pixel in the raster image, the color of the overlapping portion in the raster image is made to a color obtained by superimposing a color of the foreground object on a color of the background object.

Figure 3:
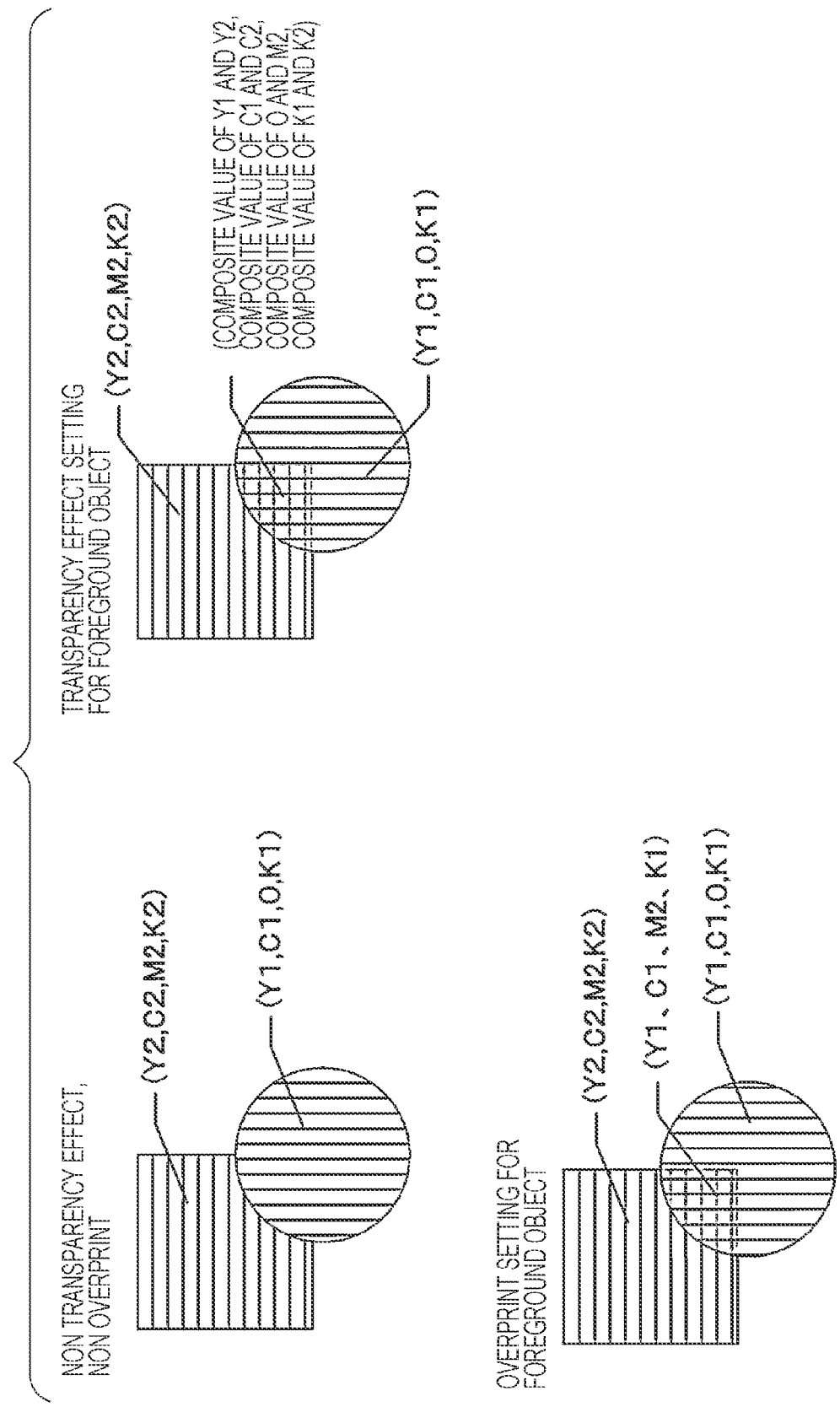
FIG. 3 is a diagram illustrating objects included in image data.

Here, the transparency effect and the overprint will be described with reference to FIG. 3. FIG. 3 shows a situation in which two objects overlap. In the present embodiment, layers are virtually defined, and each object is associated with the layer to which each object belongs. When each object is disposed on respective layers without the transparency effect and the overprint, the object on the upper layer is the foreground of the object on the lower layer. When neither the transparency effect nor the overprint is set for the foreground object, the color of the portion at which the two objects overlap is the color of the foreground object. Also, when the transparency effect is set for the foreground object, the color of the portion at which the two objects overlap is the color obtained by combining the color of the foreground object with the color of the background object at a ratio according to the transmittance of the color of each object. For example, in the YMCK color space, each gradation value of YMCK is a composite value of each gradation value of YMCK in the foreground object and each gradation value of YMCK in the background object. When the overprint is set for the foreground object, the color of the portion at which the two objects overlap is the color obtained by superimposing the color of the foreground object on the color of the background object. For example, in the YMCK color space, the color of the portion for a color whose gradation value is 0 among the YMCK gradation values of the foreground object is the color of the background object, and the color of the portion for the remaining colors other than the color whose gradation value is 0 is the color of the foreground object.

The period required for the image process has a correlation with the attributes of the image data to be image processed. This is because when the properties and characteristics of the image data are different, the entire image process will fluctuate. For example, the number of the objects included in the image data has a correlation with the period required for the image process. In the RIP process, each object in the image data is converted into an image in the raster image. Therefore, as the number of the objects included in the image data increases, the number of steps in the image process tends to increase, and the period required for the image process tends to increase. The processing load in image process differs depending on the type of object. For example, since the character object includes font information, it may take longer period of time to perform processing due to the processing burden of analyzing font information than an object that does not include font information, such as a stream object that shows a figure.

Figure 4:
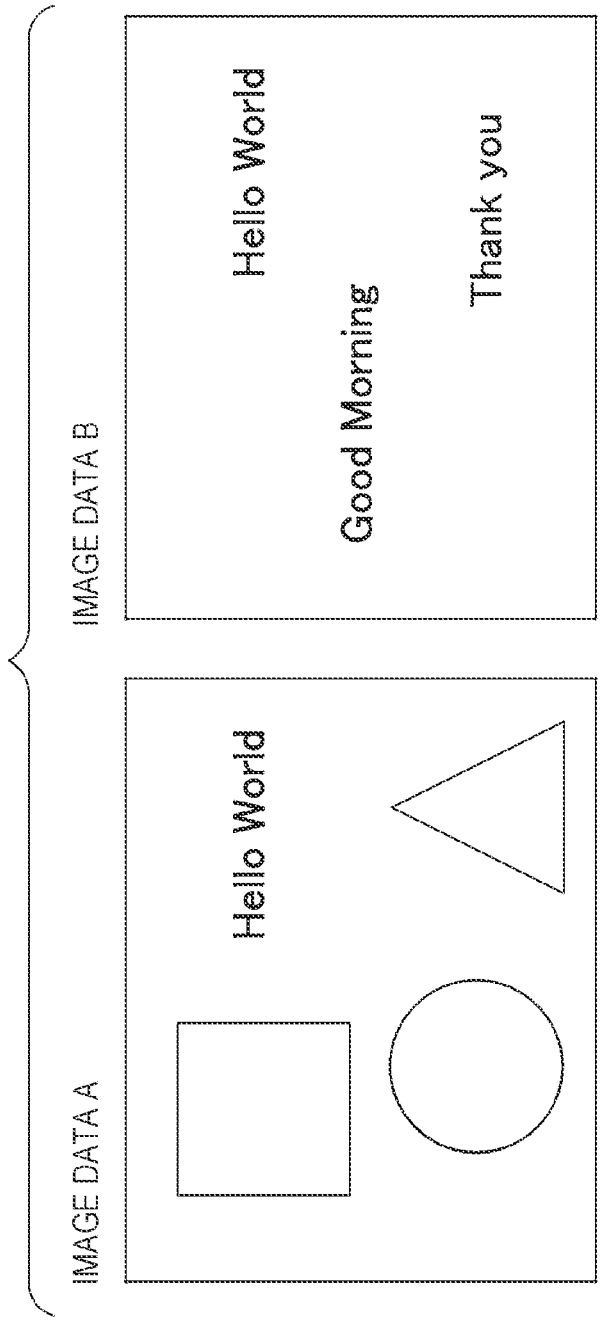
FIG. 4 is a diagram illustrating a situation in which objects overlap.

For example, as in the case of the two image data shown in FIG. 4, the smaller the number of the objects included, the longer the period required for the RIP process may be. The image data A in FIG. 4 is image data including one character object ("Hello World") and three stream objects (circle, rectangle, triangle). The image data B in FIG. 4 is image data including three character objects ("Hello World", "Good Morning", and "Thank you"). The image data A has a larger total number of the objects than the image data B. However, the image data B has a larger number of character objects than the image data A. Therefore, due to the burden of the font information analysis process, the image data B may take a longer period of time to perform the image process than the image data A. That is, the number of the objects included in the image data and the period required for the image process on the image data do not have a simple linear correlation.

In addition, the content of the image process on each object differs depending on the effect set for each object, and the period required for the image process varies. In image process, the larger the number of the objects whose effect is set, the greater the processing load tends to be. However, for example, for the spot color, since the color of the object is set to a predetermined value, the processing load of the color conversion may be reduced. Further, depending on the image processing engine used for the image process, the image process may be performed so as not to reflect a specific effect. In such a case, the processing load may not increase even when the effect is set. Therefore, as the number of the objects whose effect is set increases, the processing load does not necessarily increase, and the image process does not necessarily require a longer period of time. As described above, the period required for the image process has a correlation with the attribute of the image data to be image processed, but it is difficult to accurately grasp what kind of correlation the period has with the attribute.

In S110 the processor 40 compares, based on the function of the image processing application 41, the size of the raster image to which the image data for printing is converted with the size of the image indicated by the image data to derive the scaling factor of the image data for printing. Further, the processor 40 adjusts the size and position of each object in the image data for printing based on the derived scaling factor. Further, when there is a print setting on the size of the image (for example, designation of scaling factor, single-sided printing of a plurality of pages, or the like), the processor 40 adjusts the size and position of each object in the image data for printing according to this print setting. In S115, the processor 40 generates a raster image from the image data for printing based on the function of the image processing application 41. More specifically, the processor 40 first generates a bitmap image in which each object in the image data is disposed at the position and the size adjusted in S115. Then, the processor 40 converts the color of each object in the generated bitmap image from the color space in the image data to the color space in the raster image. At this time, the processor 40 adjusts the color according to the set effect for the object whose effect such as the spot color, the transparency effect, and the overprint is set. Then, the processor 40 performs halftone process on the bitmap image whose color of each object is adjusted so that the bitmap image can be used for printing by the printer 4 to generate a final raster image. The processor 40 transmits the generated raster image to the printer 4 and instructs printing.

The period required for the image process also correlates with the performance of the image processing device that executes the image process. Since the CPU, the memory, and the recording medium in the image processing device are mainly used in the image process, the performance of the CPU, the memory, and the recording medium has an influence on the period required for the image process greater than other performances. The printer 4 performs printing on a print medium such as paper or film based on the raster image transmitted from the image processing device 3.

In the present embodiment, the computer 1 predicts the period required for the RIP process before the start of the RIP process by the image processing device 3. Therefore, the computer 1 machine-learns in advance a model in which the period required for the RIP process can be predicted at a stage before the start of the RIP process. In the present embodiment, the teacher data 20a and the test data 20d are the following data. That is, these data is data in which the attribute information of the image data, the setting information related to the image process performed on the image data, and the performance information of the image processing device that executed the image process on the image data, and the period actually required for the image process are associated with each other.

Further, in the present embodiment, the model input information, the teacher data 20a, the attribute information of the image data included in the test data 20d, and the attribute information of the image data acquired by the information acquisition unit 12a are the following information. That is, the information is information indicating at least one of the data size of the image data, the number of the objects included in image data, types of the objects included, the number of the objects included whose spot color is set, presence or absence of the objects included whose spot color is set, the number of the objects included whose transparency effect is set, presence or absence of the objects included whose transparency effect is set, the number of the objects included whose overprint is set, and presence or absence of the objects included whose overprint is set.

Further, in the present embodiment, the model input information, the teacher data 20a, the setting information related to the image process included in the test data 20d, and the setting information related to the image process acquired by the information acquisition unit 12a are the following information. That is, the information is information indicating at least one of the type of the image processing engine used for the image process, the setting of the scaling factor of the image data, presence or absence of color replacement, and the color setting.

Further, in the present embodiment, the model input information, the teacher data 20a, the performance information of the image processing device included in the test data 20d, and the performance information of the image processing device acquired by the information acquisition unit 12a are the following information. That is, the information is information indicating at least one of the memory usage rate, the available memory capacity, the CPU usage rate, the CPU performance (for example, the number of clocks, the number of cores, and the like), and the recording medium performance (for example, type, writing speed, reading speed, and the like).

(2) Machine-Learning Process

Figure 5:
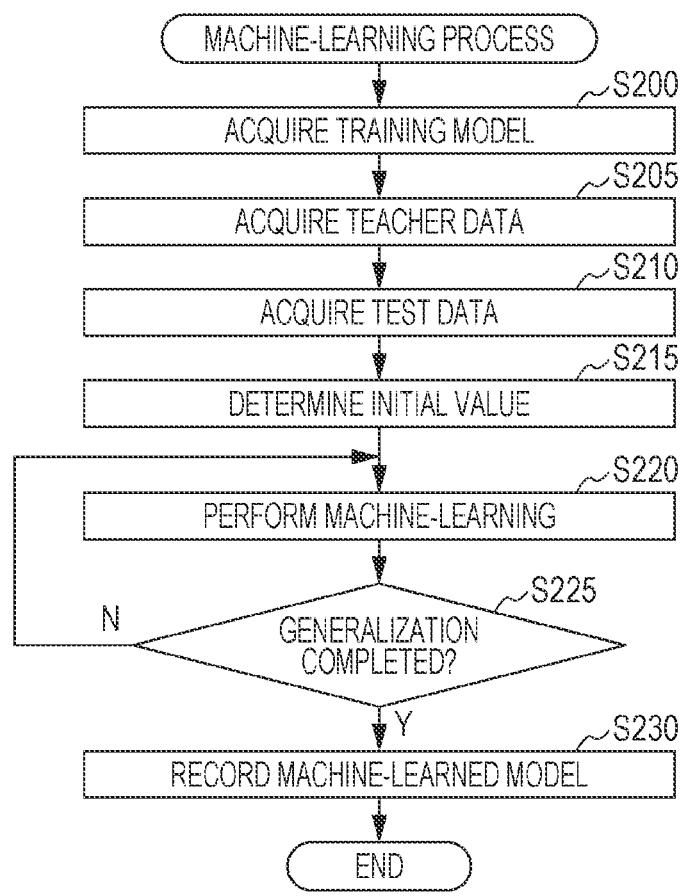
FIG. 5 is a flowchart showing an example of a model learning process.
Figure 6:
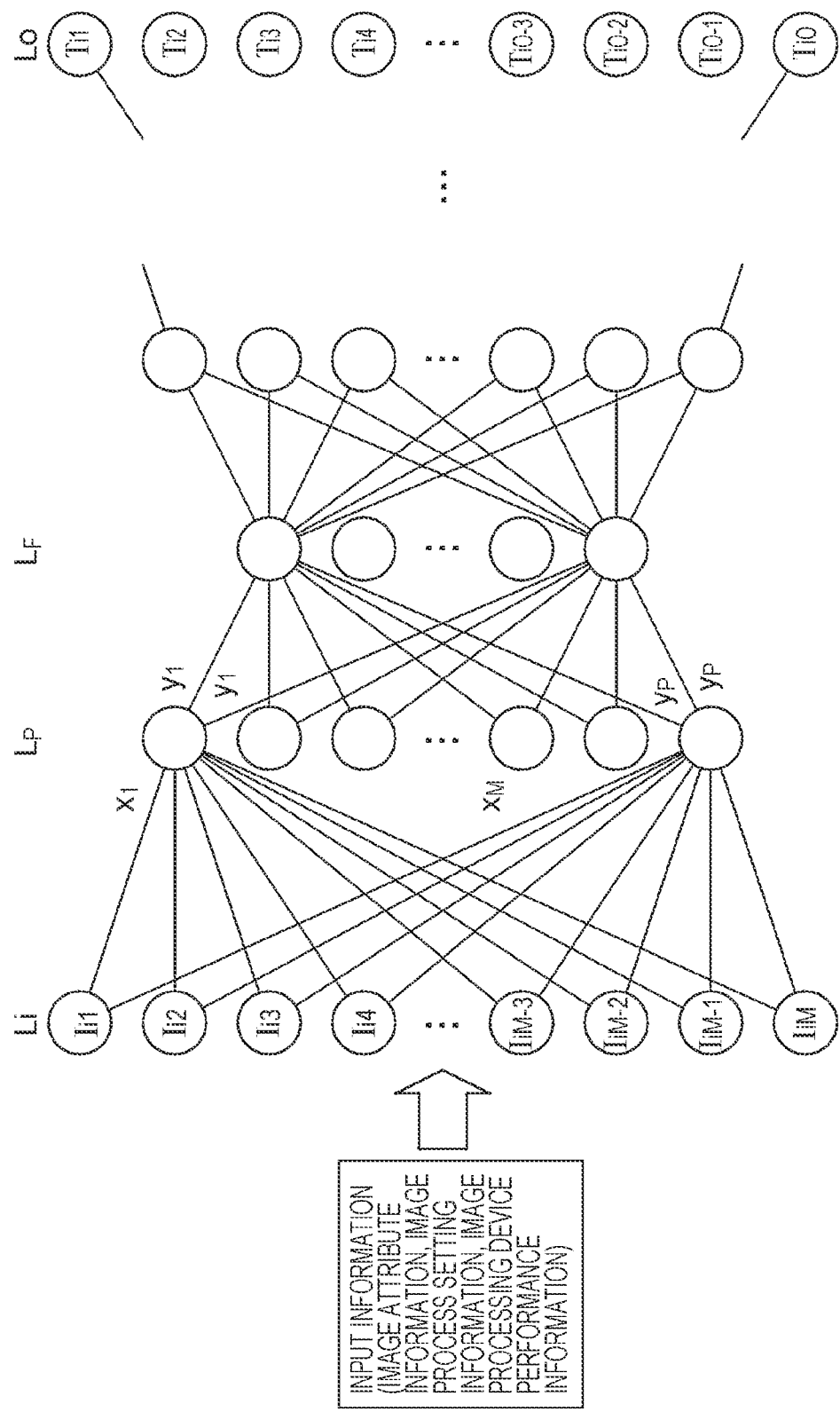
FIG. 6 is a diagram illustrating an example of the structure of a neural network.

Next, the machine-learning process executed by the processor 10 will be described. FIG. 5 is a flowchart showing the machine-learning process. The machine-learning process is executed in advance before the execution of the period prediction process for predicting the period required for the image process. In S200, the processor 10 acquires the training model 20b from the HDD 20 based on the function of the learning unit 11c. As long as the input data is converted into the output data, the model can be defined in various ways. In the present embodiment, at least part of the training model 20b includes a neural network. FIG. 6 is a diagram schematically showing an example of the structure of the neural network included in the model used in the present embodiment. In FIG. 6, nodes that mimic neurons are shown as circles, and couplings between nodes are indicated by solid straight lines (however, only part of the nodes and couplings are shown for the sake of simplicity). Also, in FIG. 6, the nodes belonging to the same layer are shown vertically, where the leftmost layer is an input layer Li and the rightmost layer is an output layer Lo.

Here, among the layers other than the input layer Li and the output layer Lo, the layer close to the input layer Li is referred to as an upper layer, and the layer close to the output layer Lo is referred to as a lower layer. Further, a direction toward the input layer Li is the upper direction, and a direction toward the output layer Lo is the lower direction. That is, a structure in which outputs from a layer which is higher than a certain layer by one layer correspond to inputs to the certain layer, and values obtained by respectively multiplying the inputs by weights and respectively adding biases to the multiplied resultant values are output through an activation function is illustrated. For example, it is assumed that the number of layer $L_P$ nodes shown in FIG. 6 is P, the input data for each node of the layer $L_P$ is $x_1, \ldots, x_M$, the biases are $b_1, \ldots, b_P$, the weights for the k-th node of the layer $L_P$ are $w_{k1}, \ldots, w_{kM}$, and the activation function is h(u). In this case, the intermediate output $u_1, \ldots, u_P$ at each node of the layer $L_P$ are expressed by the following Equation 1.

$$(u_1 \ldots u_k \ldots u_P) = (x_1 \ldots x_k \ldots x_M) \begin{pmatrix} w_{11} & \ldots & w_{k1} & \ldots & w_{P1} \\ & & \vdots & & \\ w_{1k} & \ldots & w_{kk} & \ldots & w_{Pk} \\ & & \vdots & & \\ w_{1M} & \ldots & w_{kM} & \ldots & w_{PM} \end{pmatrix} + (b_1 \ldots b_k \ldots b_P) \qquad (1)$$

Therefore, by substituting Equation 1 into the activation function h ($u_k$), the outputs $y_1, \ldots, y_P$ at each node of the layer $L_P$ are obtained.

The model includes such nodes, which are provided over a plurality of layers. Therefore, in the present embodiment, the model includes data showing at least the weights, the biases, and the activation function in each layer. Various functions, for example, a sigmoid function, a hyperbolic function (tank), a rectified linear unit (ReLU), and other functions can be used as the activation function. A nonlinear function may be preferably used. Of course, the model may include other conditions in machine-learning, such as parameters such as the type of optimization algorithm and the learning rate. Further, the number of layers, the number of nodes, and the coupling relationship of the correlation in the model may have various modes.

In the present embodiment, the model in which the attribute information of the image data, the setting information related to the image process, and the performance information of the image processing device are used as the input data to the input layer Li, and the output data indicating the period required for the image process is output from the output layer Lo is constructed. For example, in the example shown in FIG. 6, it is expected that the input data to each node of the input layer Li includes (values that normalize) values indicating the attribute information of the image data, the setting information related to the image process, and the performance information of the image processing device (standardized value).

For example, it is assumed that the attribute information of the image data is information indicating the type of the object included in the image data, the setting information related to the image process is information indicating the type of the image processing engine, and the performance information of the image processing device is information indicating the type of the recording medium. In this case, an example of the information indicating the type of the object included in the image data includes information of the array in which each element corresponds to the type of the object and each element value represents the number of the corresponding type of objects. In this case, respective element values of this array are input to the nodes of the input layer Li.

In addition, an example of the information indicating the type of the image processing engine includes information of the array in which each element corresponds to the type of the image processing engine, and each element value indicates a value (for example, 0, 1, and the like) according to whether the corresponding type of the image processing engine is used. Further, an example of the information indicating the type of the recording medium includes information of the array in which each element corresponds to the type of the recording medium, and each element value indicates a value (for example, 0, 1, and the like) according to presence or absence of the corresponding type of recording medium.

Further, an example in which the output data from the output layer Lo indicates the range of the period required for the image process can be expected. An example of the configuration in which the period required for the image process is output includes a configuration in which each node is assigned a time range such as 0 minutes or more and less than 10 minutes, 10 minutes or more and less than 20 minutes, 20 minutes or more and less than 30 minutes, or the like, and the period indicated by the range assigned to the node that outputs the maximum value is regarded as the period required for the image process.

Further, part of the model shown in FIG. 6 may be expressed by a known function, the remaining part thereof may be expressed by an unknown function, and part of the unknown function may be as a learning target. In any case, it suffices when a model is constructed in which the period required for the image process is output when the model input information is input. In the present embodiment, the model is constructed based on this idea, because this idea is based on the fact that the period required for the image process correlates with the attributes of the target image data, the setting related to the image process, and the performance of the image processing device that executes the image process. In the example shown in FIG. 6, for example, the period with which the node corresponding to the highest value among the output values ($T_{i1}$ to $T_{iO}$) of the output layer Lo is associated is predicted as the period required for the image process. For example, when the output value of the node with which the period of 10 minutes or more and less than 20 minutes is associated is higher than the output value of other nodes, the period required for the image process is predicted as 10 minutes or more and less than 20 minutes. However, the model may be constructed so that the period with which the node corresponding to the lowest value of the output values of the output layer Lo is associated is predicted as the period required for the image process. Further, the number of nodes included in the output layer Lo may be one. In this case, the model is constructed so as to output (a value that normalizes) the period required for the image process to the output layer Lo.

In the training model 20b acquired in S200, the number of layers and the number of nodes in each layer are predetermined, but the parameters (weights, biases, and the like described above) that define the input/output relationship are not optimized. These parameters are optimized (that is, trained) during the machine-learning process. Although the training model 20b is predetermined, it may be input based on the operation by the user of the computer 1 of an input device such as a mouse or a keyboard, or may be received from another device.

The description of FIG. 5 is made again. In S205, the processor 10 acquires the teacher data 20a from the HDD 20 based on the function of the teacher data acquisition unit 11a. In the present embodiment, the teacher data 20a is stored in the HDD 20 in advance.

In S210, the processor 10 acquires the test data 20d from the HDD 20 based on the function of the teacher data acquisition unit 11a. The test data 20d is data used for checking the effectiveness of the machine-learned model, and includes at least data not included in the teacher data 20a. In the present embodiment, the test data 20d is stored in the HDD 20 in advance. The amount of information of the test data 20d and the amount of information of the teacher data 20a may be various amounts, but in the present embodiment, the amount of information of the teacher data 20a is larger than that of the test data 20d.

In S215, the processor 10 determines the initial value of each parameter to be updated in the training model 20b acquired in S200 based on the function of the learning unit 11c. The initial value may be determined by various methods. For example, the processor 10 may determine a random value, 0, or the like as an initial value, or may determine an initial value by different methods for weight and bias. Further, the processor 10 may adjust the initial value so that the parameters are optimized in the process of learning.

In S220, the processor 10 machine-learns the training model 20b in which the initial value of each parameter to be updated is determined in S215 based on the function of the learning unit 11c. That is, the processor 10 inputs the teacher data 20a acquired in S205 into the training model 20b acquired in S200, and derives output indicating the period required for the image process. Further, the period output from the training model 20b and the period for the teacher data 20a are substituted for the objective function related to the error between the derived period and the period indicated by the teacher data 20a. In this way, the objective function can be regarded as a function for each parameter to be updated. Then, the processor 10 repeats the process of updating each parameter to be updated a predetermined number of times based on the differentiation by each parameter to be updated of the objective function.

When the output value of the training model is expressed as T and the period indicated by the teacher data 20a is expressed as t, the objective function can be expressed as L(T, t) with T and t as arguments. Of course, various functions can be used as the objective function. The objective function is, for example, a cross entropy error or the like. Further, the objective function may be, for example, a function related to another index in addition to the error between the period of output from the training model 20b and the period indicated by the teacher data. For example, the objective function may include a term that is noise with respect to an error between the period of output from the training model 20b and the period indicated by the teacher data in order to prevent overlearning. The process of deriving the objective function L as described above is performed on all the data included in the teacher data 20a, and the objective function in one time learning is expressed by the average or the sum of the data. For example, when the objective function is represented by the sum, the processor 10 finds the entire objective function E using the following Equation 2.

$$E = \sum_i Li(Ti, ti) \qquad (2)$$

When the objective function E is obtained, the processor 10 updates each parameter to be updated in the training model 20b by a predetermined optimization algorithm, for example, a stochastic gradient descent method or the like.

In S225, the processor 10 determines whether the generalization of the training model 20b is completed based on the function of the learning unit 11c. More specifically, the processor 10 inputs the test data 20d acquired in S210 into the training model 20b machine-learned in S220 to acquire the output period. The processor 10 acquires the number of pieces of data in which the output period and the period required for the image process associated with the test data 20d match, and divides the acquired number by the number of pieces of data included in the test data 20d to acquire the estimation accuracy. In the present embodiment, the processor 10 determines that the generalization is completed when the acquired estimation accuracy is equal to or greater than the threshold value. When it is determined that the generalization is completed, the processor 10 advances the process to S230, and when it is determined that the generalization is not completed, the processor 10 advances the process to S220 and performs machine-learning again.

The processor 10 may verify the validity of hyperparameters in addition to the evaluation of generalization performance. That is, in a configuration in which the hyperparameters that are variable quantities other than weights and biases, such as the number of nodes, are tuned, the processor 10 may verify the validity of the hyperparameters based on the verification data. The verification data may be acquired by the same process as in step S210. In S230, the processor 10 stores the machine-learned training model 20b in the HDD 20 as the machine-learned model 20c.

According to the above configuration, the computer 1 can machine-learn a model that predicts the period required for the image process from arbitrary model input information. The attribute information of the image data and the setting information related to the image process on the image data are information indicating the conditions of the entire image process on the image data. Therefore, the computer 1 can add the condition of the entire image process by machine-learning a model that predicts the period required for the image process from such information, and machine-learn the model that predicts the period required for the image process more accurately. Further, it is difficult to grasp what kind of correlation the attribute information of the image data and the setting information related to the image process have with the period required for the image process. Therefore, by using the model learned by the learning unit 11b, it is possible to predict the period required for more accurate image process without having to grasp what kind of correlation the information has with the period. That is, the computer 1 can contribute to more accurate prediction of the period by machine-learning the model. Further, the computer 1 learns a model that accepts, as input, performance information of the image processing device that executes the image process. As a result, the computer 1 can machine-learn a model that predicts the period required for the image process with higher accuracy. Further, the attribute information of the image data, the setting information of the image process, and the performance information of the image processing device are information that can be acquired before the execution of the image process. Therefore, the computer 1 can learn a model that can predict the period required for the image process before executing the image process.

Further, in the present embodiment, it is assumed that the attribute information of the image data in the model input information is information indicating at least one of the data size of the image data, the number of the objects included in image data, types of the objects included, the number of the objects included whose spot color is set, presence or absence of the objects included whose spot color is set, the number of the objects included whose transparency effect is set, presence or absence of the objects included whose transparency effect is set, the number of the objects included whose overprint is set, and presence or absence of the objects included whose overprint is set. The data size of the image data is an index that clearly indicates the amount of data to be image processed. Further, the object in the image data is a target that is actually output as a print target, and is a portion to be mainly processed in the image process. Therefore, these attributes have a greater correlation with the period required for the image process than other attributes. The computer 1 can machine-learn a model that can predict the period required for the image process more accurately by using the teacher data including the information of such attributes.

Further, in the present embodiment, it is assumed that the setting information, related to the image process, included in the model input information is information indicating at least one of the type of the image processing engine used for the image process, the setting of the scaling factor of the image data, presence or absence of color replacement, and the color setting. How the image process is actually performed depends mainly on the image processing engine. Further, changing the setting items for the size and the color of the image data causes a change in the content of the image process itself. That is, these settings can be regarded as the main setting in the image process. Therefore, the computer 1 can machine-learn a model that can predict the period required for the image process more accurately by using the teacher data including the information of such main settings.

Further, in the present embodiment, it is assumed that the performance information, of the image processing device, included in the model input information is information indicating at least one of the memory usage rate, the available memory capacity, the CPU usage rate, the CPU performance, and the recording medium performance. The CPU, the memory, and the recording medium are the main elements involved in the image process in the image processing device. Therefore, the computer 1 can machine-learn a model that can predict the period required for the image process more accurately by using the teacher data including the information of such main elements.

(3) Period Prediction Process

Figure 7:
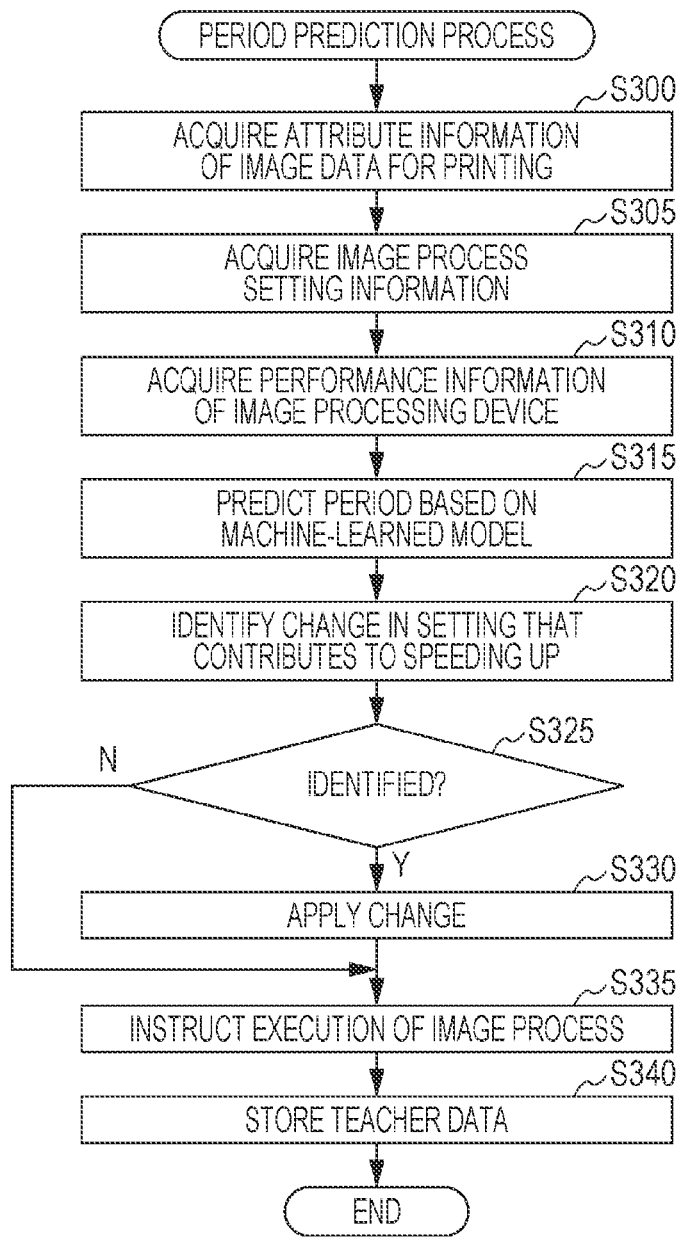
FIG. 7 is a flowchart showing an example of a period prediction process.

Next, the period prediction process executed by the processor 10 will be described. FIG. 7 is a flowchart showing an example of the period prediction process. The period prediction process is executed by the computer 1 when a print job is received from the client PC 2. In S300, the processor 10 acquires the attribute information of the image data included in the print job received from the client PC 2 based on the function of the information acquisition unit 12a. In the present embodiment, the processor 10 performs a syntactic analysis on the image data to acquire the attribute information of the image data. In S305, the processor 10 acquires the setting information, about the image process on the image data for printing, shown in the print job received from the client PC 2 based on the function of the information acquisition unit 12a. In the present embodiment, the client PC 2 causes the setting information indicating the setting, related to the image process, input from the user via the UI of the implemented printer driver to be included in the print job. Therefore, the processor 10 can acquire the setting information related to the image process from the received print job. In S310, the processor 10 acquires the performance information of the image processing device 3 that executes the image process on the image data for printing based on the function of the information acquisition unit 12a. In the present embodiment, the processor 10 inquires of the image processing device 3 about the performance information to acquire the performance information of the image processing device 3 from the image processing device 3. However, when the performance information of the image processing device 3 is stored in the HDD 20 in advance, the processor 10 may acquire the performance information of the image processing device 3 from the HDD 20.

In S315, the processor 10 inputs the model input information acquired in S300, S305, and S310 as model input information into the machine-learned model 20c acquired from the HDD 20 based on the function of the prediction unit 12b. Then, the processor 10 sets the period predicted from the machine-learned model 20c as a prediction value of the period required for the image process on the image data for printing.

In S320, the processor 10 identifies a change, in the setting of the image process, that contributes to speeding up the image process on the image data for printing based on the function of the processing unit 12c. More specifically, the processor 10 identifies, from the HDD 20, data in which the data attribute information of the image data, the setting information related to the image process, the performance information of the image processing device the period actually required for the image process are associated with each other. For example, the processor 10 identifies the teacher data 20a, the test data 20d, and the like. Then, the processor 10 identifies, from the identified data, data in which the attribute information of the corresponding image data is the same as the information acquired in S300. The processor 10 identifies, from the identified data, data in which the period required for the corresponding image process is shorter than the period predicted in S315. The processor 10 acquires setting information related to the image process corresponding to the identified data. Then, the processor 10 identifies a change to the content of the acquired setting information about the setting related to the image process as a change that contributes to speeding up the image process.

In S325, the processor 10 determines whether to identify the change that contributes to speeding up the image process in S320 based on the function of the processing unit 12c. When it is determined in S325 that the change contributing to speeding up the image process is identified, the processor 10 advances the process to S330, and when it is determined that the change cannot be identified, the processor 10 ends the process of FIG. 7. In S330, the processor 10 applies the change identified in S320 to the setting related to the image process corresponding to the print job received from the client PC 2 based on the function of the processing unit 12c.

As described in S320 to S330, it is assumed that the processor 10 identifies the change, in the setting related to the image process, that contributes to the speedup, and applies the identified change when the change is identified. As a result, the computer 1 can increase the speed of the image process. However, even when the processor 10 can identify the change, in the setting related to the image process, that contributes to the speedup, the processor 10 may not apply the identified change in a situation where the identified change is predetermined. For example, it is assumed that a change to an image processing engine that does not reflect the transparency effect is identified as contributing to the speedup. In this case, when the image data for printing includes an object whose transparency effect is set, the transparency effect will not be reflected. In this situation, processor 10 may not apply the identified change. As described above, when a change that causes a contradiction with the attribute of the image data for printing is identified, the processor 10 may not apply the identified change.

In S335, the processor 10 instructs the image processing device 3 to execute the print job received from the client PC 2. On this occasion, when the process of S330 is executed, the processor 10 instructs execution of the image process with the setting changed in S330, and when the process of S330 is not executed, the processor 10 instructs execution of the image process with the setting indicated by the setting information acquired in S305. Then, the processor 40 of the image processing device 3 executes the image process corresponding to the print job instructed by the computer 1 to be executed based on the function of the image processing application 41 to generate a raster image. The processor 40 transmits the generated raster image to the printer 4 and instructs printing. Then, the printer 4 perform printing based on the received raster image. In the present embodiment, the processor 40 measures the period actually required for the image process when executing the image process to transmit the measured period to the computer 1 after the completion of the image process.

In S340, the processor 10 associates the information acquired in S300 to S310 with the period actually required for the image process received from the image processing device 3 based on the function of the storage controller 12d. Then, the processor 10 stores the associated data as the teacher data used for re-machine-learning the machine-learned model 20c in the HDD 20 to update the teacher data 20a. Further, the processor 10 may delete the oldest data in the teacher data 20a when storing the new teacher data. When storing the new teacher data based on the function of the storage controller 12d, the processor 10 may re-machinelearn the machine-learned model 20c as the training model 20b based on the function of the learning unit 11b. In this case, the processor 10 may use the data included in the teacher data 20a before update in addition to the newly stored teacher data to perform machine-learning, or may use only the newly stored teacher data to perform machine-learning. As a result, the model can be improved. In this way, the processor 10 can contribute to improvement of the machine-learned model 20c by storing the new teacher data based on the function of the storage controller 12d.

According to the above configuration, the computer 1 can predict the period required for the image process from arbitrary model input information. The attribute information of the image data and the setting information related to the image process on the image data are information indicating the conditions of the entire image process on the image data. Therefore, the computer 1 can add the condition of the entire image process by predicting the period required for the image process from such information, and machine-learn the model that predicts the period required for the image process more accurately. Further, it is difficult to grasp what kind of correlation the attribute information of the image data and the setting information related to the image process have with the period required for the image process. Therefore, by using the machine-learned model 20c, the computer 1 can predict the period required for the image process more accurately without needing to grasp what kind of correlation there is. Further, the computer 1 predicts the period required for the image process based on the performance information of the image processing device that executes the image process in addition to the attribute information of the image data, the setting information related to the image process. As a result, the computer 1 can more accurately predict the period required for the image process. Further, the attribute information of the image data, the setting information of the image process, and the performance information of the image processing device are information that can be acquired before the execution of the image process. Therefore, the computer 1 can predict the period required for the image process before executing the image process.

Further, in the present embodiment, it is assumed that the attribute information of the image data in the model input information is information indicating at least one of the data size of the image data, the number of the objects included in image data, types of the objects included, the number of the objects included whose spot color is set, presence or absence of the objects included whose spot color is set, the number of the objects included whose transparency effect is set, presence or absence of the objects included whose transparency effect is set, the number of the objects included whose overprint is set, and presence or absence of the objects included whose overprint is set. The data size of the image data is an index that clearly indicates the amount of data to be image processed. Further, the object in the image data is a target that is actually output as a print target, and is a portion to be mainly processed in the image process. Therefore, these attributes have a greater correlation with the period required for the image process than other attributes. The computer 1 can predict the period required for the image process more accurately by using the information of such attributes.

Further, in the present embodiment, it is assumed that the setting information, related to the image process, included in the model input information is information indicating at least one of the type of the image processing engine used for the image process, the setting of the scaling factor of the image data, presence or absence of color replacement, and the color setting. How the image process is actually performed depends mainly on the image processing engine. Further, changing the setting items for the size and the color of the image data causes a change in the content of the image process itself. That is, these settings can be regarded as the main setting in the image process. Therefore, the computer 1 can more accurately predict the period required for the image process based on the information about such a main setting.

Further, in the present embodiment, it is assumed that the performance information, of the image processing device, included in the model input information is information indicating at least one of the memory usage rate, the available memory capacity, the CPU usage rate, the CPU performance, and the recording medium performance. The CPU, the memory, and the recording medium are the main elements involved in the image process in the image processing device. Therefore, the computer 1 can more accurately predict the period required for the image process based on the information about such a main element.

(4) Other Embodiments

The above embodiment is an example for carrying out the present disclosure, and various other embodiments can be implemented. The method of predicting the period required for the image process and the method of performing machine-learning of the model for prediction based on the model input information as in the above embodiment can be implemented as disclosures of a program and a method.

Further, a configuration in which the functions of the computer 1 are implemented by a plurality of devices may be employed. For example, a server and a client are configured to be coupled, the machine-learning program may be executed by one of the server and the client, and the period prediction program may be performed by the other. When the machine-learning and the period prediction process are executed by devices that are located at distant positions, the machine-learned model may be shared by the respective devices or may exist in one device. When the machine-learned model exists in a device that performs machine-learning and does not exist in a device that performs the period prediction process, a configuration is such that the device that performs the period prediction process inquires of the device that performs machine-learning about the prediction result by the machine-learned model. Of course, a configuration in which the machine-learning device is dispersed in a plurality of devices, a configuration in which the information processing device is dispersed in a plurality of devices, or another configuration may be used. Furthermore, the above-described embodiment is an example, and an embodiment in which part of the configuration is omitted or another configuration is added may be employed.

Further, in the above-described embodiment, it is assumed that the image processing application 41, which is a function of performing the image process, is mounted on the image processing device 3, which is a device different from the computer 1. However, the function of performing the image process may be implemented in the computer 1. In this case, the printer 4 may be connected to the computer 1.

Further, in the above-described embodiment, it is assumed that the model input information includes the attribute information of the image data, the setting information related to the image process, and the performance information of the image processing device. However, the model input information may be another information as long as it includes at least one of the attribute information of the image data and the setting information related to the image process. For example, the model input information may be the attribute information of the image data or the setting information related to the image process. Further, the model input information may not include the performance information of the image processing device. Further, the model input information may include information (for example, the period required for the image process on part of the image data) that can be acquired after execution of the image process is started. In this case, the learning unit 1ib learns data, as the teacher data 20a, in which the information similar to the model input information and the period required for the image process are associated. In addition, the information acquisition unit acquires information, as the information to be input to the model, same as the model input information. The attribute information of the image data and the setting information related to the image process are information indicating the conditions of the entire image process. Therefore, it is possible to add the condition of the entire image process by using at least one of the attribute information of the image data and the setting information related to the image process, and more accurately predict the period required for the image process.

Figure 8:
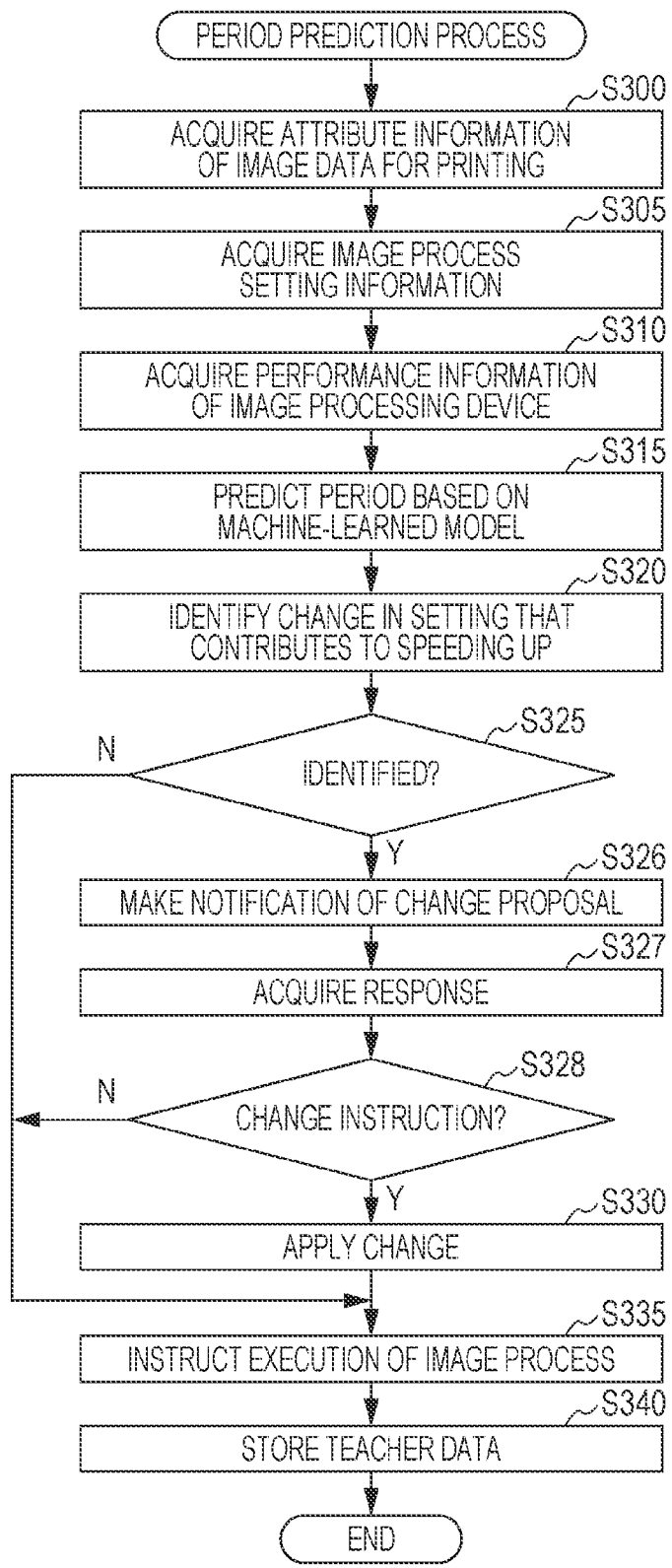
FIG. 8 is a flowchart showing an example of a period prediction process.

Further, in the above-described embodiment, it is assumed that the processor 10 identifies the change, in the setting related to the image process, that contributes to speeding up the image process in S320 to S330 of FIG. 7 based on the function of the processing unit 12c, and applies the identified change. When the processor 10 identifies a change that contributes to speeding up the image process, the processor 10 may notify the user of proposal of the identified change. For example, the processor 10 may execute the process of the flowchart of FIG. 8. The process of FIG. 8 which is different from that of FIG. 7 will be described. The process of FIG. 8 is different from that of FIG. 7 in that the process of S326 to S328 is included. Among the steps in the flowchart of FIG. 8, the process of the steps having the same numbers as those of FIG. 7 is the same as that of FIG. 7. When it is determined in S325 that a change that contributes to speeding up the image process is identified, the processor 10 advances the process to S326.

In S326, the processor 10 notifies the predetermined notification destination of the information indicating the proposal of the change identified in S320 based on the function of the processing unit 12c. Here, a case where the predetermined notification destination is the client PC 2 will be described as an example. The client PC 2 presents to a user information indicating the notified change by displaying the information on a display unit such as a monitor. As a result, the user can grasp the setting, related to the image process, that can speed up the print job. In addition, the client PC 2 inquires of the user whether to apply the notified change. For example, the client PC 2 displays, on the display unit, a dialog used for selecting whether to apply the notified change. When the client PC 2 acquires the result of the inquiry based on the user's operation via the input device, the client PC 2 transmits the acquired result as a response to the notification in S326 to the computer 1.

In S327, the processor 10 acquires the response to the notification in S326 based on the function of the processing unit 12c. In S328, the processor 10 determines whether the response acquired in S327 is an instruction to change the setting of the image process based on the function of the processing unit 12c. When it is determined that the response acquired in S327 is an instruction to change the setting of the image process, the processor 10 advances the process to S330, and when it is determined that the response is not an instruction to change the setting of the image process, the processor 10 ends the process of FIG. 8. This enables a print job that more reflects the user's intention.

Figure 9:
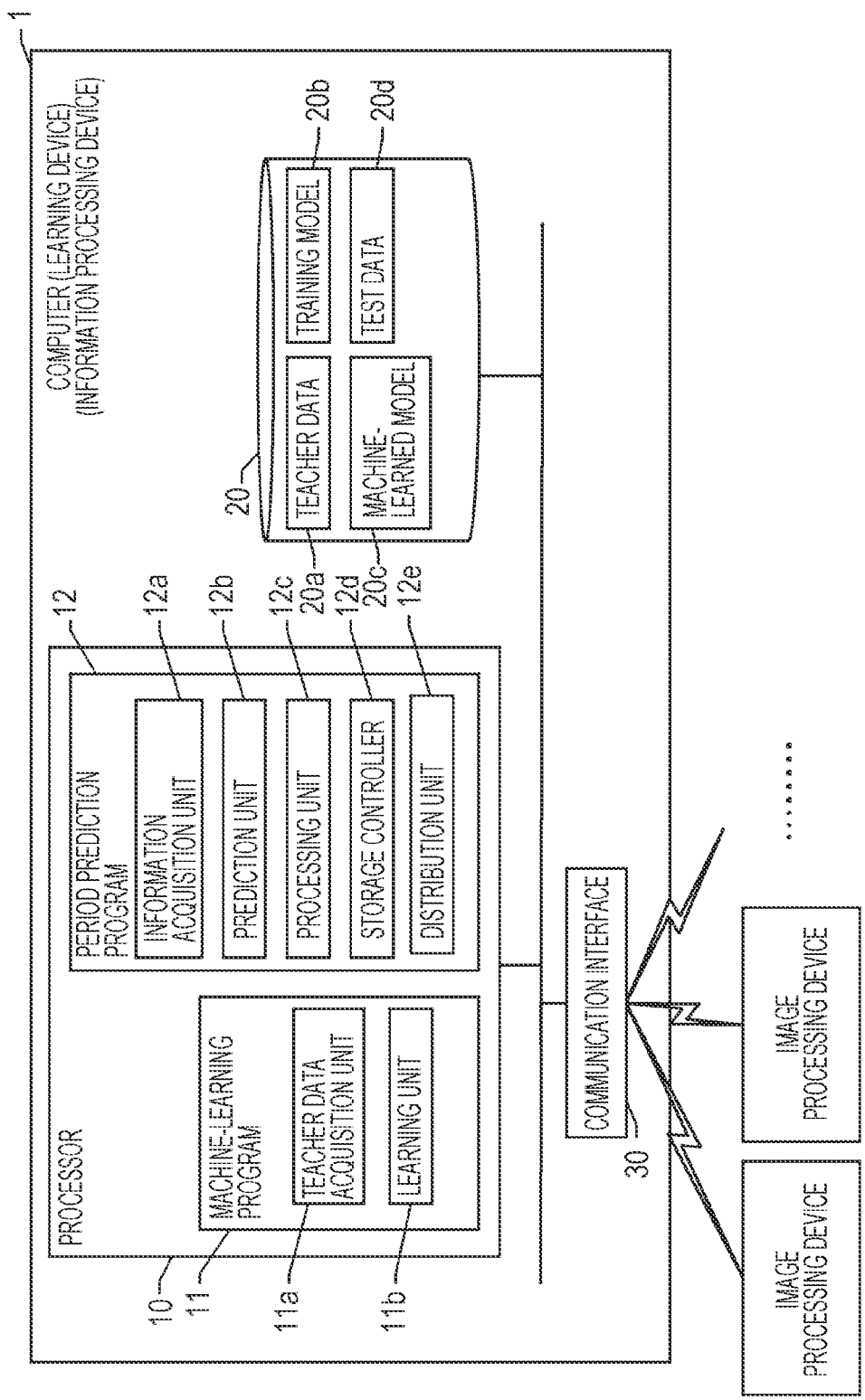
FIG. 9 is a diagram showing an example of a computer configuration.

Further, in the above-described embodiment, it is assumed that the image process is mainly performed by one image processing device 3. However, the image process may be mainly performed by a plurality of the image processing devices. In this case, when the computer 1 receives the print job, the computer 1 allocates the received print job to any of the plurality of image processing devices. FIG. 9 shows an example of the configuration of the computer 1 in this case. In the example of FIG. 9, unlike FIG. 1, the computer 1 further functions as a distribution unit 12e when executing the period prediction program 12. Further, a plurality of image processing devices is connected to the computer 1.

An example of the period prediction process performed by the computer 1 in this case will be described with reference to FIG. 10. The computer 1 starts the process of FIG. 10 when receiving a plurality of print jobs. In S400, the processor 10 selects one that has never been selected from a plurality of pieces of the image data for printing corresponding to a plurality of print jobs based on the function of the information acquisition unit 12a. In the following, the image data selected in S400 will be used as the selected image data. In S405, the processor 10 acquires the attribute information of the selected image data based on the function of the information acquisition unit 12a. In S410, the processor 10 acquires the setting information about the image process on the selected image data based on the function of the information acquisition unit 12a. In S415, the processor 10 acquires the performance information of each of the plurality of image processing devices based on the function of the information acquisition unit 12a.

In S420, the processor 10 combines information acquired in S400 and S405 about the selected image data with the plurality of performance information acquired in S410 based on the function of the prediction unit 12b to acquire a plurality of model input information. Then, the processor 10 inputs the acquired plurality of model input information into the machine-learned model 20c to predict a plurality of periods required for the image process. Here, the plurality of predicted periods is prediction values of periods required for the image process when the image process is performed on the corresponding image data in the respective image processing devices corresponding to the performance information input to the model at the time of prediction.

In S420, the processor 10 identifies the image processing device capable of completing the image process on the selected image data earliest based on the prediction result in S415 by the function of the distribution unit 12e to distribute the print job corresponding to the selected image data to the identified image processing device. More specifically, the processor 10 specifies, from the result of the prediction in S420, the period required for the image process on the selected image data in each of the plurality of image processing devices. Also, when there is an image processing device to which the print job has already been distributed, the processor 10 specifies the value predicted in S415 before the processing time as the period required for the image process on the image data of the distributed print job in the image processing device. The processor 10 adds the period required for the image process on the selected image data to the period required for the image process on the print job that has already been distributed for each of the plurality of image processing devices to obtain the period until the completion of the image process on the selected image data.

The processor 10 identifies the shortest period of the period until the completion of the image process obtained for each of the plurality of image processing devices to distribute the print job of the selected image data to the image processing device corresponding to the identified period.

For example, it is assumed that three image processing devices A to C are connected to the computer 1, and the computer 1 receives the three print jobs α to γ. The image data for printing for the print jobs α to γ is assumed to the image data α to γ, respectively. In this case, it is assumed that the image data α is first selected in S400. In S420, in the image processing devices A to C, it is assumed that the period required for the image process on the image data α is 10 minutes for the image processing device A, 20 minutes for the image processing device B, and 30 minutes for the image processing device C. In this case, the print job is not distributed to any of the image processing devices. Therefore, as in the period predicted in S420, in S425, the period until the process of the image data α, which is the required selected image data, is completed is 10 minutes for the image processing device A, 20 minutes for the image processing device B, and 30 minutes for the image processing device C. In this case, since the period for the image processing device A is the shortest, the print job α is distributed to the image processing device A in S425, and the process proceeds to S400 again.

Next, in S400, it is assumed that the image data β of the print job β is selected as the selected image data. In S420, in the image processing devices A to C, it is assumed that the period required for the image process on the image data β is 5 minutes for the image processing device A, 10 minutes for the image processing device B, and 10 minutes for the image processing device C. In this case, since the print job α has already been distributed to the image processing device A, the image processing device A does not execute the image process until the image process on the image data α is completed. Therefore, in S425, for the image processing device A, the period until the image process required is completed is a value (15 minutes) obtained by adding the period (5 minutes) predicted in S420 to a value (10 minutes) predicted as the period required for the image process of the image data α in the image processing device A in the past S420. For the image processing devices B and C, the period until the process of the image data β, which is the selected image data, is completed is obtained in the same manner as the period predicted in S420. As a result, the period until the process of the image data β, which is the selected image data required in S425, is completed is 15 minutes for the image processing device A, 10 minutes for the image processing device B, and 10 minutes for the image processing device C. In this case, since the period for the image processing devices B and C is the shortest, the print job β is distributed to any of the image processing devices B and C in S425, and the process proceeds to S400 again. In this example, it is assumed that the print job β is distributed to the image processing device B.

Next, in S400, the image data γ of the print job γ is selected as the selected image data. In S420, in the image processing devices A to C, it is assumed that the period required for the image process on the image data γ is 5 minutes for the image processing device A, 30 minutes for the image processing device B, and 10 minutes for the image processing device C. In this case, since the print job α has already been distributed to the image processing device A, the image processing device A does not execute the image process until the image process on the image data α is completed. Therefore, in S425, for the image processing device A, the period until the image process required is completed is a value (15 minutes) obtained by adding the period (5 minutes) predicted in S420 to a value (10 minutes) predicted as the period required for the image process of the image data α in the image processing device A in the past S420. Further, since the print job β has already been distributed to the image processing device B, the image processing device B does not execute the image process until the image process on the image data β is completed. Therefore, in S425, for the image processing device B, the period until the image process required is completed is a value (40 minutes) obtained by adding the period (30 minutes) predicted in S420 to a value (10 minutes) predicted as the period required for the image process of the image data β in the image processing device A in the past S420. For the image processing device C, the period until the process of the image data γ, which is the selected image data, is completed is obtained in the same manner as the period predicted in S420. As a result, the period until the process of the image data γ, which is the selected image data required in S425, is completed is 15 minutes for the image processing device A, 40 minutes for the image processing device B, and 10 minutes for the image processing device C. In this case, since the period for the image processing device C is the shortest, the print job γ is distributed to the image processing device C in S425, and the process of FIG. 10 is completed.

As described above, the computer 1 distributes the plurality of jobs based on the predicted period required for the image process for each of the plurality of pieces of the image data of the plurality of jobs. As a result, the computer 1 can add the period required for the image process on a plurality of pieces of the image data for printing, and distribute the plurality of jobs so as to shorten the period until the end of the job.

The image data may be data indicating an image. For example, the image data may be image data in a format used for instructing to a printer for printing, such as image data expressed in a page description language. For example, the image data may be XML Paper Specification (xps) data, PostScript data, or the like. Further, the image data may be image data in a format such as jpg. Further, the image data is not limited to the image data included in the print job, and may not be the data for printing. The image process may be any process that performs some operations on the image data. The image process may be a conversion process to a format used for printing, such as the RIP process. Further, the image process may be a process of converting the image data into image data in a format different from that of the raster image. The period required for the image process may be a period predicted as a period from the start to the end of the image process. The period required for the image process may be expressed in, for example, minutes, seconds, hours, defined period units (for example, a unit of 10 minutes such as 0 minutes or more and less than 10 minutes, 10 minutes or more and less than 20 minutes, 20 minutes or more and less than 30 minutes, . . . ).

The attribute information of the image data may be information indicating the attribute, of the image data, that changes the image processing content. Therefore, the attribute information of the image data may be information different from the information indicating at least one of a data size of the image data, the number of objects included in the image data, types of the objects, the number of the objects whose spot color is set, presence or absence of the objects whose spot color is set, the number of the objects whose transparency effect is set, presence or absence of the objects whose transparency effect is set, the number of the objects whose overprint is set, and presence or absence of the objects whose overprint is set, or may be information indicating another attribute in addition to at least one of these attributes. For example, the attribute information of the image data may be information indicating the number of portions where objects in the image data overlap.

The setting information related to the image process may be information indicating the setting that change the image processing content. Therefore, the setting information related to the image process may be information different from the information indicating at least one of a type of an image processing engine used for the image process, a setting of a scaling factor of image data, presence or absence of color replacement, and a color setting, or information indicating another setting in addition to at least one of these settings. For example, the setting information related to the image process may be information indicating the type of algorithm used in the image processing engine, a setting whether to reflect the effect set on the object in the image data, and the like.

The performance information of the image processing device may be information indicating the performance, of the image processing device, that changes the image processing content. Therefore, the performance information of the image processing device may be information different from the information indicating at least one of a memory usage rate, an available memory capacity, a CPU usage rate, a CPU performance, and a recording medium performance, or may be information indicating another performance in addition to at least one of these performances. For example, the performance information of the image processing device may be information indicating presence or absence of the processor for the image process, and the like.

The model may accept model input information to output the period required for the image process. Therefore, the model may be a model different from the model constructed using the neural network, and, for example, may be constructed using a support vector machine, clustering, reinforcement learning, a random forest, or the like. Further, the model may be a model that is not machine-learned. For example, the model may be a model constructed based on the correlation between the model input information and the period required for the image process, which are specified by the user's analysis.

The teacher data acquisition unit only may acquire the teacher data used for machine-learning the model. The teacher data acquisition unit may acquire, for example, the teacher data based on input from the user, or may acquire the teacher data from an external recording medium. The learning unit may machine-learn a model that predicts the period required for the image process from at least one input of the attribute information of the image data and the setting information related to the image process. The machine-learning method may be various methods. That is, it suffices when a model that outputs the period required for the image process from the input information can be constructed and learning in which the value of the defined objective function is optimized can be performed.

Therefore, for example, when the machine-learning using the neural network is performed, the machine-learning may be performed by appropriately selecting various elements such as the number of layers constituting the model, the number of nodes, the type of the activation function, the type of the objective function, the type of the gradient descent method, the type of the optimization algorithm of the gradient descent method, presence or absence of mini-batch learning or the number of batches, the learning rate, the initial value, the type of an overlearning suppression method or presence or absence of the overlearning suppression method, presence or absence of a convolution layer, the size of a filter in a convolution operation, the type of the filter, the type of padding and stride, the kind of a pooling layer, presence or absence of the pooling layer, presence or absence of a total binding layer, and presence or absence of a recursive structure. Of course, other types of models, such as a support vector machine, clustering, reinforcement learning, and machine-learning such as random forest, may be performed.

Furthermore, machine-learning in which the model structure (for example, the number of layers, the number of nodes per layer, and the like) is optimized may be performed. Further, the machine-learning may be divided into a plurality of stages and be executed. Further, in a configuration in which machine-learning is performed on the server, teacher data may be collected from a plurality of clients, and the machine-learning may be performed based on the teacher data.

The information acquisition unit may acquire the information input to the model. For example, the information acquisition unit may acquire the information input to the model based on the input from the user, may acquire the information input to the model from an external device, or may acquire the information input to the model by analyzing the image data. The prediction unit may predict the period required for the image process from at least one of the attribute information of the image data and the setting information related to the image process. The prediction unit may predict the period required for the image process using a machine-learned model, or may predict the period required for the image process using a non-machine-learned model (for example, a default function).

The storage controller may store, in any storage unit, the data, as the teacher data for re-machine-learning the model, in which the information acquired as information input to the model by the information acquisition unit and the period actually required for the image process are associated with each other. The storage controller may store this data not only in the recording medium of the storage controller itself but also in, for example, an external recording medium. The distribution unit may distribute, based on the period predicted by the prediction unit for each of a plurality of pieces of image data, to a plurality of image processing devices, a plurality of respective jobs of performing the image process on the plurality of respective pieces of image data. For example, the distribution unit may distribute the print jobs to the image processing device capable of completing the image process earliest in the order of completion of the prediction of the period required for the image process on the image data for printing. When a plurality of respective print jobs is randomly distributed to any of a plurality of image processing devices, the print jobs may be concentrated on a specific image processing device, and it may take an excessive period to complete the image process for all the print jobs. With the above configuration, the distribution unit can prevent the period until the image process for all the plurality of pieces of the image data is completed from being excessive. Further, the distribution unit can distribute any job of a plurality of jobs as long as the jobs include executing the image process. For example, the distribution unit may distribute a job of the image process in which printing instruction is not included.

Furthermore, the present disclosure can also be applied as a program or method executed by a computer. Further, the above-described program and method may be implemented using a single device or may be implemented using components included in a plurality of devices, and include various aspects. Further, changes may be made as appropriate, as in the case where part of the embodiment is software and part of the embodiment is hardware. Furthermore, the disclosure is established as a recording medium of a program. Of course, the recording medium of the program may be a magnetic recording medium, a semiconductor memory, or any recording medium to be developed in the future.

What is claimed is:

1. An information processing device comprising:
   an information acquisition unit configured to acquire at least one of 1) attribute information of image data to be image processed and 2) setting information related to an image conversion process for converting the image data into a raster image used for printing;
   a prediction unit configured to predict, based on a model that accepts input of at least one of the attribute information and the setting information to output a period of time required for the image conversion process, a period of time required for the image conversion process on the image data, the prediction based on information acquired by the information acquisition unit; and
   a processing unit configured to identify, based on the period of time required for the image conversion process, a change in the attribute information or the setting information to speed up the image conversion process on the image data and to make a proposal of the identified change, wherein
   the attribute information indicates at least one of a number of objects whose spot color is set, presence or absence of the objects whose spot color is set, a number of objects whose overprint is set, and presence or absence of the objects whose overprint is set, and
   when the identified change causes a contradiction with a predetermined setting of the image data, the processing unit does not apply the identified change.

2. The information processing device according to claim 1, wherein the attribute information further indicates at least one of a data size of the image data, a number of objects included in the image data, types of the objects, a number of the objects whose transparency effect is set, and presence or absence of the objects whose transparency effect is set.

3. The information processing device according to claim 1, wherein the setting information indicates at least one of a type of an image processing engine used for the image conversion process, a setting of a scaling factor of image data, presence or absence of color replacement, and a color setting.

4. The information processing device according to claim 1, wherein the model accepts input of at least one of the attribute information and the setting information, and performance information of an image processing device that executes the image conversion process to output a period of time required for the image conversion process.

5. The information processing device according to claim 4, wherein the performance information indicates at least one of a memory usage rate, an available memory capacity, a CPU usage rate, a CPU performance, and a recording medium performance.

6. The information processing device according to claim 1, wherein the model is machine-learned based on teacher data in which at least one of the attribute information and the setting information, and a period of time required for the image conversion process are associated with each other.

7. The information processing device according to claim 6, further comprising:
   a storage controller configured to store, in a storage unit, as the teacher data used for re-machine-learning the model, data in which at least one of the attribute information of the image data for which a period of time required for the image conversion process is predicted by the prediction unit and the setting information of the image conversion process performed on the image data, and a period of time actually required for the image conversion process on the image data are associated with each other.

8. The information processing device according to claim 1, further comprising:
   a distribution unit configured to distribute, based on a period of time predicted by the prediction unit for each of a plurality of pieces of image data, to a plurality of image processing devices, a plurality of respective jobs of performing the image conversion process on the plurality of respective pieces of image data.

9. A prediction method comprising:
   acquiring at least one of 1) attribute information of image data to be image processed and 2) setting information related to an image conversion process for converting the image data into a raster image used for printing, the attribute information indicating at least one of a number of objects whose spot color is set, presence or absence of objects whose spot color is set, a number of objects whose overprint is set, and presence or absence of the objects whose overprint is set;
   predicting, based on a model that accepts input of at least one of the attribute information and the setting information to output a period of time required for the image conversion process, a period of time required for the image conversion process on the image data, the prediction based on the information acquired; and
   identifying, based on the period of time required for the image conversion process, a change in the attribute information or the setting information to speed up the image conversion process on the image data and making a proposal of the identified change, wherein
   when the identified change causes a contradiction with a predetermined setting of the image data, the processing unit does not apply the identified change.

10. A non-transitory computer-readable storage medium storing a program, the program causing a computer to function as:
    an information acquisition unit configured to acquire at least one of 1) attribute information of image data to be image processed and 2) setting information related to an image conversion process for converting the image data into a raster image used for printing, the attribute information indicating at least one of a number of the objects whose spot color is set, presence or absence of the objects whose spot color is set, a number of objects whose overprint is set, and presence or absence of the objects whose overprint is set;
    a prediction unit configured to predict, based on a model that accepts input of at least one of the attribute information and the setting information to output a period of time required for the image conversion process, a period of time required for the image conversion process on the image data, the prediction based on information acquired by the information acquisition unit; and
    a processing unit configured to identify, based on the period of time required for the image conversion process, a change in the attribute information or the setting information to speed up the image conversion process on the image data and to make a proposal of the identified change, wherein when the identified change causes a contradiction with a predetermined setting of the image data, the processing unit does not apply the identified change.

\* \* \* \* \*